July 20, 1943.    C. A. ARENS    2,324,475
CONTROL MECHANISM
Filed July 29, 1940    2 Sheets-Sheet 2
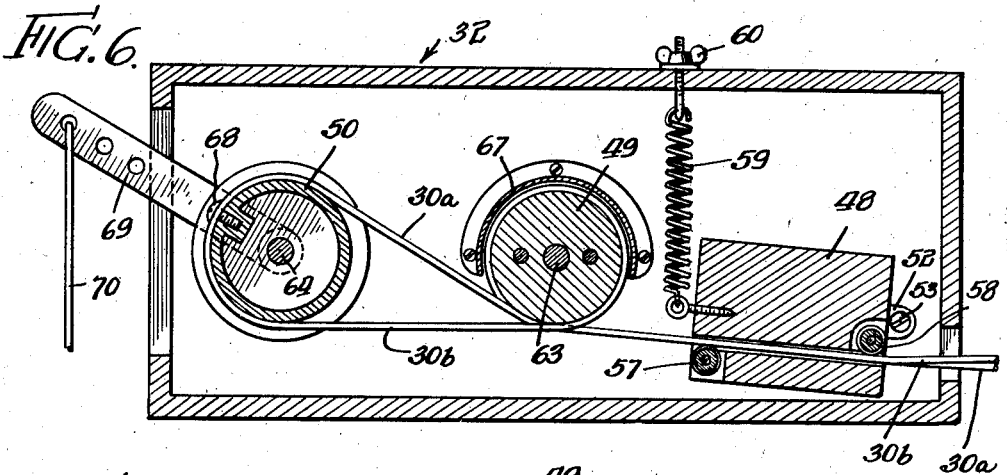
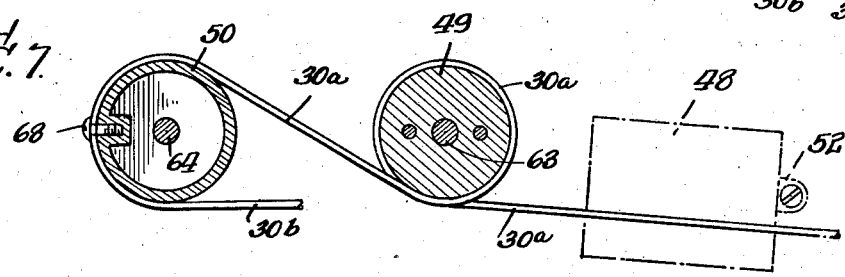
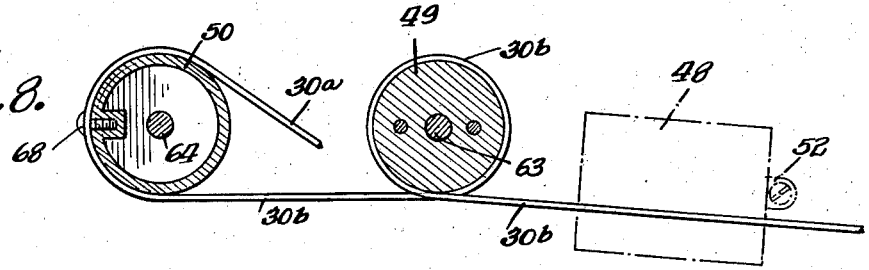
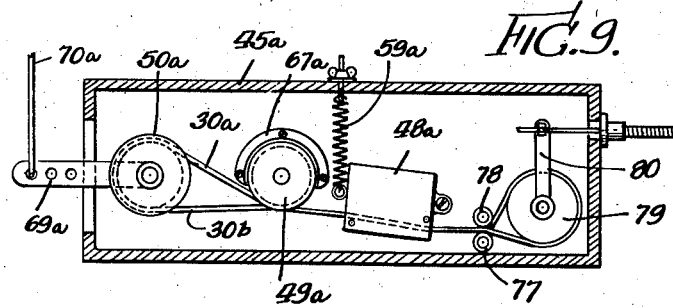
INVENTOR.
Charles A. Arens
BY: Cox Moore & Olson
ATTORNEYS Patented July 20, 1943

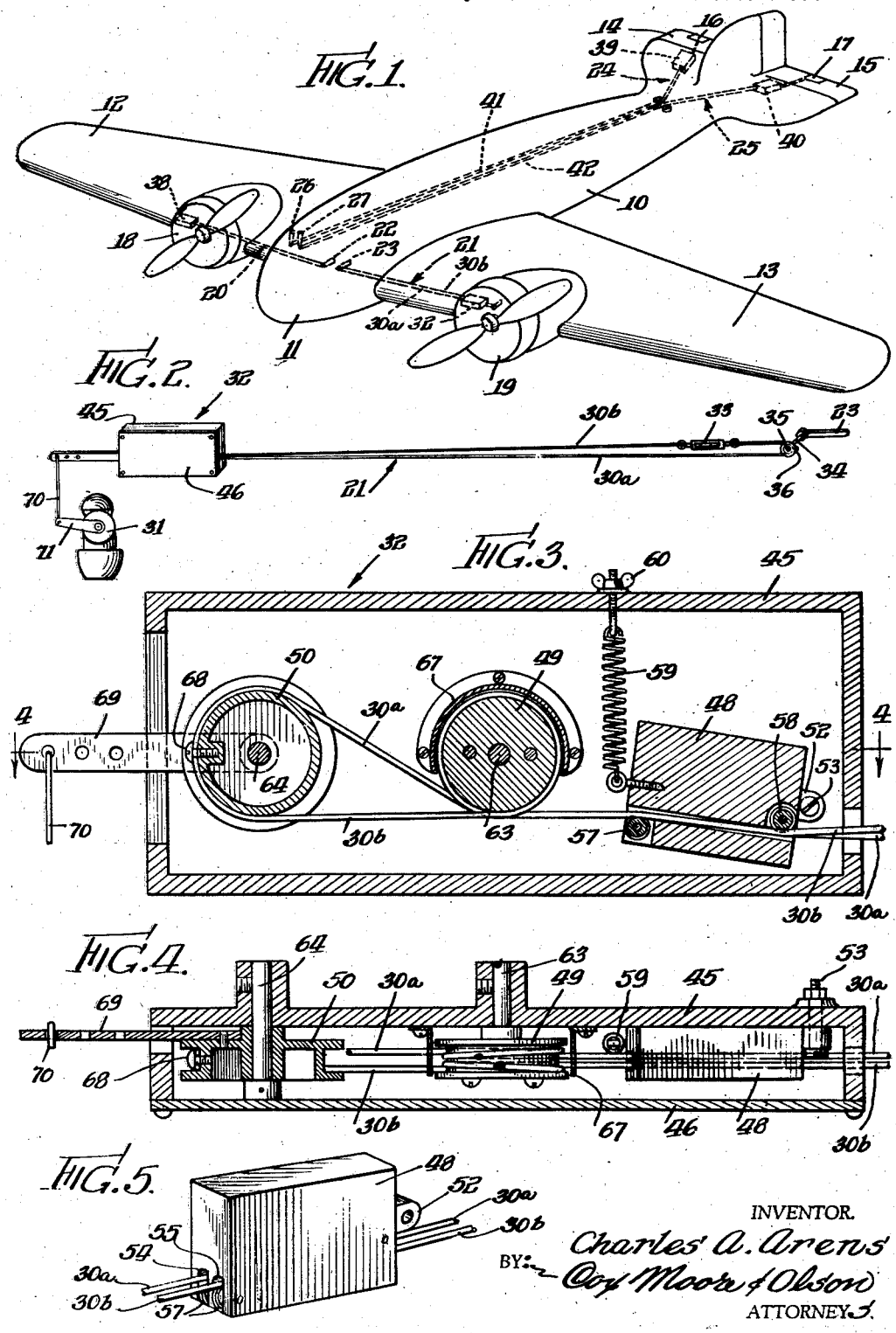

2,324,475

UNITED STATES PATENT OFFICE 2,324,475

CONTROL MECHANISM

Charles A. Arens, Chicago, Ill., assignor to Arens Controls, Inc., Chicago, Ill., a corporation of Illinois Application July 29, 1940, Serial No. 348,190

13 Claims. (Cl. 74—531)

This invention relates to control mechanisms, and particularly to control mechanisms of the self-locking type adapted to automatically apply a predetermined frictional or locking resistance to movement of the mechanism and devices controlled thereby upon release of the manual control or actuating member.

In the use of control mechanisms of the type wherein a control member, generally manually actuated, is utilized to apply a predetermined movement or movements to devices to be controlled it is frequently desirable that a predetermined frictional or locking action be applied to the control mechanism upon release of the control member whereby to hold the actuated devices in adjusted position against inadvertent or unauthorized movement. In instances where the devices are subjected to vibration or unbalanced forces the applied locking action must frequently be of appreciable magnitude and yet be readily releasable to permit adjustment by the control member when adjustment is desired. The provision of a suitable locking arrangement is frequently further complicated by reason of the fact that the control member and the devices to be controlled thereby may be located at relatively removed or separated points.

The present invention concerns the solution of the foregoing problems and to that end contemplates the provision of a control mechanism of the self-locking type of simplified construction and improved operating characteristics; and more particularly provides a control mechanism of the type stated which may be readily operated at all times by the main control or actuating member associated therewith but which is instantaneously self-locking to apply a predetermined frictional or locking resistance to unauthorized movement of the devices to be controlled. In accordance with the invention the frictional or locking resistance is automatically removed as the main control or actuating member is operated, and automatically applied as the member is released.

A further object of the invention is to provide a control mechanism of the self-locking type particularly adapted for use in installations where the main actuating or control member is located at a point relatively removed or remote from the devices to be controlled. In accordance with the invention a locking or frictional retention means is associated with the control mechanism at a point immediately adjacent the device or devices to be controlled whereby to accurately retain such devices against unauthorized movement notwithstanding relative displacement or motion taking place between the mounting frames for the controlled devices and the main control or actuating member. At the same time the locking or frictional retention means is instantaneously and automatically released upon operation of the main control or actuating member.

Still another object of the invention is to provide a control mechanism of the type stated wherein the frictional resistance of the locking or frictional retention means may be readily adjusted and arranged to successfully resist the forces tending to produce unauthorized movement of the controlled devices in any given installation. More particularly, the frictional resistance may be adjusted from a relatively light frictional resistance to movement, to a substantially positive lock.

Various other objects, advantages and features of the invention will be apparent from the following specification when taken in connection with the accompanying drawings wherein certain preferred embodiments of the invention are set forth for purposes of illustration.

In the drawings, wherein like reference numerals refer to like parts throughout:

Fig. 1 is an illustrative view, diagrammatic in form, illustrating one typical installation for which the control mechanism of the present invention is particularly adapted.

Fig. 2 is a general assembly view, also somewhat diagrammatic in form, of the control mechanism.

Fig. 3 is a detail view of the self-locking or frictional retention means.

Fig. 4 is a sectional view of the mechanism shown in Fig. 3 on the line 4—4 thereof.

Fig. 5 is a perspective detail of the automatically operated cable tension block associated with the locking means.

Fig. 6 is a view similar to Fig. 3, but showing the locking means when the tension block is in released position.

Figs. 7 and 8 are illustrative views showing more particularly the manner in which the cable is applied to the snubbing unit, and Fig. 9 illustrates a modified form of construction embodying the principles of the invention, and applied to a Bowden wire type of control.

Referring more particularly to the drawings, and first to the illustrative view, Fig. 1, the control mechanism of the invention is shown applied to the various controls for aircraft, as illustrative installations to which the invention is well adapted. The aircraft, shown diagrammatically, comprises a main body or fuselage 10 including a control cockpit 11, wings 12 and 13, elevators 14 and 15, and a rudder. Elevators 14 and 15 are provided with elevator tabs 16 and 17 respectively the purpose of which, as is known in the aircraft art, may be to balance the elevators to a predetermined normal position. Motors 18 and 19 may be mounted in and carried by the wings 12 and 13 respectively.

By way of illustration the control mechanism of the invention is shown applied to the control of the motors 18 and 19 and the elevator tabs 16 and 17. More specifically control mechanisms generally indicated by the numerals 20 and 21 are provided for the motors, and may for example be carburetor controls for controlling the individual engine speeds. These controls are adapted to be operated from within the cockpit by means, for example as indicated by the levers 22 and 23. Similarly controls generally indicated by the numerals 24 and 25 are provided for controlling the position of the tabs 16 and 17, the controls being respectively and individually operable by suitable levers within the cockpit for example as indicated by the numerals 26 and 27.

The control 21 is shown more specifically in Fig. 2 and comprises in general a cable or wire, the forward and return reaches of which are indicated respectively by the numerals 30a and 30b, connecting the manual control or actuating lever 23 with the engine carburetor 31. A locking or frictional retention device, generally indicated by the numeral 32, is disposed at the end of the control mechanism immediately adjacent the carburetor or device to be controlled. A turnbuckle or the like 33 is provided for initially tensioning the cable to the proper degree. The manual control handle or actuating member 23 is mounted on a shaft 34 carrying a pulley 35, the cable passing around the pulley and being anchored from slippage with respect thereto by any suitable means, for example as indicated by a set screw or the like 36.

The locking or frictional retention means 32 is adapted to be automatically operable to apply a predetermined frictional resistance to movement of the control cable immediately upon release of the manual control handle 23, whereby to prevent inadvertent or unauthorized movement of the parts; and an important feature of the invention resides in the fact that the locking means is so constructed and arranged that it may be located in immediate juxtaposition to the devices to be controlled whereby to best serve its locking function, and still be instantaneously and automatically releasable to permit adjustment of the controlled devices by means of the manual control handle 23. More specifically, referring to Fig. 1, the frictional locking means or units for the motor control mechanisms are indicated by the numerals 32 and 38, whereas the locking units for the elevator tabs are indicated by the numerals 39 and 40, and it will be noted that in each instance the locking unit is disposed in close proximity to the controlled device.

The location of the locking unit within the cockpit in immediate juxtaposition to the control handles, enables the use of a unit of the type which may be manually unlocked or locked by the operator as it is desired to release the control mechanisms for adjustment or to retain them in adjusted position, as the case may be. However, it is frequently the case that no amount of locking action applied to the control mechanism in immediate juxtaposition to the control handles will serve to effectively hold the remotely situated controlled devices in proper adjusted position. For example, referring to the controls 20 and 21, in aircraft the wings such as the wings 12 and 13 experience considerable movements during flight due to the air forces applied thereto. The supports for the controlled carburetors at the outer ends of the control mechanisms may experience several inches of displacement relative to the supports for the control handles 22 or 23, and it will accordingly be seen that the locking of the control handles will not serve to effectively retain the carburetors in proper adjusted and synchronized relation. Likewise with respect to the controls 24 and 25 for the elevator tabs, not only may relative movement take place between the opposite ends of the control mechanisms, but the air pressures applied to the tabs further render it impossible to satisfactorily retain the tabs in adjusted position by locking devices disposed at a remotely situated point. More specifically, if the locking units were disposed adjacent the control handles 26 and 27, the air forces on the tabs 16 and 17, which may be variable, would impart stresses to the control wires for example as indicated at 41 and 42, causing the wires to stretch or contract, thus rendering it impossible to retain the tabs in position by the remotely disposed locking units.

In accordance with the invention, these difficulties are avoided by locating the locking units at the outer ends of the control mechanisms in immediate juxtaposition to the devices to be controlled and positioned. At the same time the locking units, though thus inaccessibly disposed, are so constructed and arranged as to be automatically locked and unlocked as the manual control handles are operated.

The locking unit 32 is shown in detail in Figs. 3 and 4. It comprises a suitable casing 45 provided with a cover 46, and adapted to enclose the locking mechanism comprising in general a cable tension block 48, a snubbing unit 49 and a pulley wheel 50. The cable tension block is shown in perspective detail in Fig. 5. It is provided with an extending ear or lug 52 adapted to receive a pivot bolt 53 by means of which the block is pivotally mounted upon the casing 45. The block is also provided with two longitudinally extending bores or passageways 54 and 55 adapted to receive the reaches 30a and 30b respectively of the control cable. To minimize friction between the cable and the block, the block also may be provided with two pairs of pulley wheels 57 and 58 engageable with the control cable reaches at either end of the bores 54 and 55. A tension spring 59 is secured at its lower end to the block, tending to rotate the block in a clockwise direction as seen in Fig. 3, the upper end of the spring being adjustably anchored to the casing 45 by means of an adjustable wing nut or the like 60.

The snubbing unit 49 comprises a stationary post-like structure circular in shape and mounted on a fixed shaft 63, whereas the pulley wheel 50 is rotatably mounted on its axle shaft 64. The control cable is wrapped around the snubbing unit and the pulley wheel in a manner which will be best understood by reference to the illustrative views, Figs. 7 and 8. It will be seen, referring to Fig. 7, that the forward reach 30a of the cable extends from the tension block, is wrapped around the snubbing unit and then extends to the upper side of the pulley wheel. The return reach, referring to Fig. 8, extends from the lower side of the pulley wheel, is wrapped around the snubbing unit and then extends to the tension block and through the bore thereof, as previously described. Referring further particularly to Figs. 3 and 4, it will be seen that both the snubbing unit and the pulley wheel are provided with flanges to retain the cable in position, and that the snubbing unit is further provided with a shield 67 mounted on the casing 45, which shield partially embraces the periphery of the snubbing unit and insures the retention of the cable turns against inadvertent displacement. A screw 68 secures the cable to the pulley wheel against longitudinal slippage with respect thereto, as previously described with reference to the pulley 35 and the associated screw 36. The pulley wheel 50 also rigidly carries an arm 69 which is adapted to actuate the carburetor 31 by means of a suitable connecting linkage such as the links 70 and 71, Figs. 2 and 3.

The operation of the control mechanism and the locking unit will be best understood with reference to Figs. 3 and 6 of the drawings. Fig. 3 shows the parts in the locking position which they occupy when the control handle 23 is not being actuated. It will be seen that the tension spring 59 will urge the tension block 48 clockwise about the pivot 53, causing the block to crimp or bend both reaches of the control cable, thus holding both reaches under a predetermined tension and in firm engagement with the peripheral surface of the snubbing unit 49. Both reaches of the cable are accordingly locked by reason of the frictional contact with the peripheral surface of the snubbing unit so that the pulley wheel 50 cannot be operated in either direction. The controlled device, such as the carburetor 31, is thus effectively held in the desired adjusted position.

Upon manipulation of the control handle 23 in either direction, the locking unit is immediately and automatically unlocked to permit the desired adjustment. More specifically, as the control handle 23 is moved in one direction or the other, either the cable reach 30a or the reach 30b will be pulled, thus causing the tension block 48 to be straightened out or pivoted slightly counterclockwise against the action of spring 59 to the position shown in Fig. 6. This releases the tension in the cable reach on the trailing side, causing the convolutions of such reach to disengage themselves from the surface of the snubbing block, thus permitting relatively free movement of the cable and the associated pulley 50 in the desired direction. For example, if the cable reach 30a is pulled by counterclockwise movement of the control handle 23, as seen in Fig. 2, the resultant straightening out of the tension block releases the tension in the reach 30b on the trailing side of the unit, thus permitting the release of the cable convolutions 30b from the snubbing unit and permitting the relatively free rotation of the pulley wheel 50 in a clockwise direction. The inherent resiliency of the control cable or wire causes the convolutions in embracing relation with the snubbing unit to automatically expand or move to release position as the cable reach is untensioned. If the control handle 23 is moved in the opposite direction, the action is reversed.

It will thus be seen that the locking unit when in normal position, automatically holds the control cable against unauthorized movement in either direction. But upon actuation of the manual control handle 23, the movement of the control handle not only pulls the cable in the desired direction, but as an incident to the pulling operation also untensions the cable reach on the trailing side thus automatically and instantaneously releasing the control for ready manipulation by the control handle. The tension block 48 serves to control the frictional engagement between the cable and the snubbing unit, but the block itself imparts no substantial frictional resistance to movement of the cable due to the rollers 57 and 58. The locking effectiveness of the snubbing unit may be predetermined for any given installation by selection of the material for the unit, and also by variation of the number of turns of the cable in embracing relation thereon. For example, if the unit is made of rubber or the like, a stronger locking action is obtained due to the higher coefficient of friction, whereas if the snubbing unit is made of metal such as aluminum a lower coefficient of friction and lighter locking action is obtained. Also, increasing the number of turns of the cable around the unit increases the locking resistance. The locking action may also be controlled by selection of the strength of the tension spring 59 and also by the adjustment means 60. A stronger spring 59 produces a stronger locking action, and the adjustment 60 may be utilized to adjust the spring so that it will be overcome, permitting the tension block 48 to move to its release Fig. 6 position as the manual control handle is operated with the normal intended force. The turn-buckle 33 is utilized only to predetermine the general length of the cable, and it will be noted that the spring 59 and the pivotal action of the block 48 normally automatically maintain the cable reaches under the desired tension, as shown in Fig. 3, notwithstanding relative displacement between the two ends of the control mechanism resulting in some increase or decrease in the length of the control, as previously described.

In Fig. 9 an embodiment is illustrated which is substantially similar to that previously described except that a Bowden wire 75 is utilized to connect the manual control handle 76 with the locking unit 45a, and the associated controlled device. In this instance the control cable 30a—30b extends from the tension block 48a past a pair of pulleys 77 and 78 to a pulley 79, the latter being provided with an arm 80 to which the end of the Bowden wire is secured. As the control handle 76 is operated in one direction or the other, the Bowden wire pushes or pulls the arm 80, thereby rotating the pulley 79 and imparting motion to the control cable 30a—30b, the action of the cable being the same as previously described.

While the invention has been described as being particularly applied to controls for aircraft, it is obvious that it is adapted for various uses and installations. It is also obvious that various changes may be made in the specific structural embodiments set forth for purposes of illustration without departing from the spirit of the invention. Accordingly the invention is not to be limited to the specific embodiments or installations set forth and described, but only as indicated in the following claims.

The invention is hereby claimed as follows:

1. A control mechanism comprising a control handle, a device to be controlled thereby, control connections between the control handle and said device to be controlled including a pair of operating members selectively operable to operate the controlled device in opposite directions, means normally operative to hold the operating members against operation, and means automatically operable as the control handle is shifted to operate one of said operating members to vary the operative connection between the holding means and the other of said operating members and thereby release the holding action therebetween.

2. A control mechanism comprising a control handle, a device to be controlled thereby, control connections between the control handle and said device to be controlled including a pair of operating members selectively operable to operate the controlled device in opposite directions, means normally operative to hold the operating members against operation, and means automatically controlled by the operation of one of said operating members for releasing the holding action between said holding means and the other of said operating members.

3. A control mechanism as defined in claim 1, wherein said pair of operating members comprise the forward and return reaches of a cable assembly operatively connected to the control handle.

4. A control mechanism as defined in claim 1, wherein the control connections comprise a Bowden wire connected to the control handle.

5. A control mechanism comprising a control handle, a device to be controlled thereby, control connections comprising a cable assembly having forward and return reaches operatively connected with the control handle and the device to be controlled, means normally operative to hold both of said cable reaches against operation, and means automatically operable by the tensioning of one of said cable reaches upon operation of the control handle to release the other cable reach whereby to permit the adjustment of the control mechanism.

6. A control mechanism comprising a control handle, a device to be controlled thereby, control connections between the control handle and said device to be controlled including a pair of elongated operating members oppositely reciprocable to operate the controlled device in opposite directions, means normally operative to hold the operating members against operation, and means automatically operable as an incident to the operation of one of said control members by the control handle for releasing the holding action between said holding means and the other of said operating members.

7. A control mechanism comprising a control handle, a device to be controlled thereby, control connections between the control handle and said device to be controlled including a pair of elongated operating members oppositely reciprocable to operate the controlled device in opposite directions, means normally operative to hold the operating members against operation, and means automatically controlled by the operation of one of said operating members for releasing the holding action between said holding means and the other of said operating members.

8. A control mechanism comprising a control handle, a device to be controlled thereby, control connections including a cable operatively connected with the control handle and said device to be controlled, means including a snubbing unit frictionally embraced by the cable normally operative to hold it against operation, and means automatically operable as an incident to the movement of the control handle for releasing the frictional engagement between the cable and said snubbing unit.

9. A control mechanism comprising a control handle, a device to be controlled thereby, control connections including a cable assembly having forward and return reaches operatively connected between the control handle and said device to be controlled, means including a snubbing unit adapted to be frictionally embraced by both of said cable reaches normally operative to hold the cable against operation, and means automatically operable as one of said cable reaches is tensioned by movement of the control handle to release the other cable reach from frictional engagement with said snubbing unit whereby to release the control mechanism for operation.

10. A control mechanism comprising a control handle, a device to be controlled thereby, control connections including a cable assembly having forward and return reaches operatively connected between the control handle and said device to be controlled, a snubbing unit adapted to be embraced by both of said cable reaches, means normally operative to apply a predetermined tension to both of said cable reaches whereby to hold said reaches in frictional locking engagement with the snubbing unit, and means automatically operable as one of said cable reaches is tensioned by movement of the control handle for disabling the tensioning means to release the other cable reach from frictional engagement with the snubbing unit whereby to release the control mechanism for operation.

11. A control mechanism as defined in claim 10 wherein means is provided for adjusting the predetermined normal tension applied to the cable reaches by the tensioning means.

12. A control mechanism comprising a control handle, a device to be controlled thereby, control connections including a cable assembly having forward and return reaches operatively connected with the control handle and said device to be controlled, a snubbing unit adapted to be embraced by both of said cable reaches, a pivotally mounted member adapted to operatively engage said cable reaches, means for resiliently urging said member on its pivot whereby to apply a predetermined tension to the cable reaches to hold the same in frictional locking engagement with the snubbing unit, and means automatically operable as either of said cable reaches is tensioned by movement of the control handle to disable the tensioning member whereby to release the other cable reach from frictional engagement with the snubbing unit and release the control mechanism for operation.

13. A control mechanism comprising a control handle, a device to be controlled thereby, control connections including a cable assembly having forward and return reaches operatively connected to the control handle, a snubbing unit adapted to be embraced by both of said cable reaches, a pivotally mounted block member having bores through which the cable reaches are adapted to extend, a spring connected with the block for urging it on its pivot whereby to normally apply a predetermined tension to the cable reaches and cause the same to frictionally engage the snubbing unit, and a member adapted to be operated by the cable and operatively connected to said device to be controlled, said spring being adapted to yield upon the tensioning of either of said cable reaches whereby to disable the tensioning action of the block.

CHARLES A. ARENS.